United States Patent Office 3,798,329
Patented Mar. 19, 1974

3,798,329
1-AMINOALKYL-DIBENZOSEMIBULLVALENES
AS ANTIDEPRESSANTS
Charles Ferdinand Huebner, Chatham, N.J., assignor to
Ciba-Geigy Corporation, Ardsley, N.Y.
No Drawing. Continuation-in-part of application Ser. No.
854,270, Aug. 29, 1969, which is a continuation-in-part
of application Ser. No. 779,257, Nov. 26, 1968. This
application Apr. 22, 1970, Ser. No. 30,988
Int. Cl. A61k 27/00
U.S. Cl. 424—330                                    4 Claims

ABSTRACT OF THE DISCLOSURE 1-aminoalkyl-dibenzosemibullvalenes, e.g. those of the formula

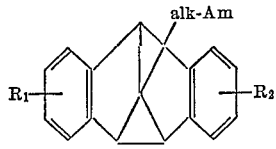

Am=an amino group
alk=alkylene
$R_{1,2}$=H, alkyl, free, etherified or esterified OH or SH, $CF_3$, $NO_2$, amino or acyl, ocyl derivatives, N-oxides, quaternaries and salts thereof are antidepressants.

CROSS-REFERENCES TO RELATED APPLICATIONS

This is a continuation-in-part of application Serial No. 854,270, filed Aug. 29, 1969, which in turn is a continuation-in-part of application Serial No. 779,257, filed Nov. 26, 1968 (both of which are now abandoned).

SUMMARY OF THE INVENTION

The present invention concerns and has for its object the provision of new 1-aminoalkyl-dibenzo-tricyclo-[3.3.0.0$^{2,8}$]octa - 3,6 - dienes (1-aminoalkyl-dibenzosemibullvalenes), more particularly of those corresponding to Formula I

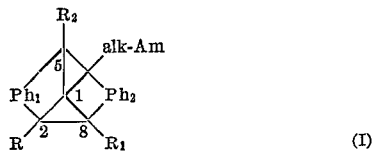

in which each of $Ph_1$ and $Ph_2$ is a 1,2-phenylene radical, alk is lower alkylene, Am is an amino group, R is hydrogen, etherified or esterified hydroxy, an aliphatic, araliphatic or aromatic radical or lower alkylene linked with Am, and each of $R_1$ and $R_2$ is hydrogen, free, etherified or esterified hydroxy or an aliphatic radical, of acyl derivatives, N-oxides, quaternaries and salts thereof, as well as of corresponding pharmaceutical compositions and of methods for the preparation of application of these products. Said products are useful antidepressants, for example, in the treatment or management of exo- or endogenous depressions.

DESCRIPTION OF THE PREFERRED EMBODIMENT

The 1,2-phenylene radicals $Ph_1$ and $Ph_2$ are unsubstituted or substituted in the remaining 4 positions by one or more than one, preferably one or two, of the same or different substituents, for example, lower alkyl, e.g. methyl, ethyl, n- or i-propyl or -butyl, free, etherified or esterified hydroxy or mercapto, such as lower alkoxy or alkylmercapto, e.g. methoxy, ethoxy, n- or i-propoxy or -butoxy, methylmercapto or ethylmercapto, lower alkanoyloxy, e.g. acetoxy, halogeno, e.g. fluoro, chloro or bromo, trifluoromethyl, nitro, amino, preferably di-lower alkylamino, e.g. dimethylamino or diethylamino, or acyl, such as lower alkanoyl or lower alkylsulfonyl, e.g. acetyl, propionyl, pivaloyl, methyl- or ethylsulfonyl. More particularly the radicals $Ph_1$ and $Ph_2$ represent $R_4$-1,2-phenylene, wherein $R_4$ is hydrogen, lower alkyl, hydroxy, lower alkoxy, halogeno, trifluoromethyl, nitro, amino or di-lower alkylamino. The term "lower," referred to above and hereinafter in connection with organic radicals or compounds respectively, defines such with up to 7, preferably up to 4, carbon atoms.

The lower alkylene radical alk and/or R is preferably methylene, but also 1,1- or 1,2-ethylene, 1,1-, 1,2-, 2,2- or 1,3-propylene, 1,1-, 1,2-, 2,2-, 1,3-, 2,3- or 1,4-butylene.

The amino group Am is a primary, preferably a secondary or tertiary amino group, containing advantageously one or two radicals of aliphatic or one of aromatic nature. Such amino groups are, for example, mono- or di-lower alkylamino, e.g. methylamino, ethylamino, i-butylamino, dimethylamino, N-methyl-N-ethylamino, diethylamino, di-n- or i-propylamino or di-n-butylamino; 3 to 7 ring-membered cycloalkylamino, cycloalkyl-lower alkylamino, di-lower alkylamino-lower alkylamino, HPh$_1$-lower alkylamino or HPh$_1$-amino and the tertiary N-lower alkyl derivatives thereof, e.g. cyclopropylamino, cyclopentylamino, cyclohexylamino, cyclopropylmethylamino, 2-dimethylamino-ethylamino, benzylamino, 2-phenethylamino or phenylamino and the tert. N-(methyl, ethyl, n- or i-propyl or -butyl)-derivatives thereof, mono- or bicyclic lower alkyleneimino or alkenyleneimino, e.g. ethyleneimino, pyrrolidino, pyrrolino, piperidino, 1,4-pentyleneimino, 2,5- or 1,6-hexyleneimino or 2,6-heptyleneimino; 2-aza-2-bicyclo[2,2,1]heptyl, 2-aza - 2 - bicyclo-[2,2,2] or [3,2,1]octyl, 3-aza-3-bicyclo[3,2,1] or [3,3,0]octyl, 2-aza-2-bicyclo[3,2,2] or [3,3,1]nonyl, 3-aza-3-bicyclo[3,2,2] or [3,3,1]nonyl, 2-aza-2-, 3-aza-3-, 7-aza-7- or 8-aza-8-bicyclo[4,3,0]nonyl or 2-aza-2- or 3-aza-3-bicyclo[4,4,0]decyl, or monocyclic monoaza-, -oxa- or -thia-lower alkyleneimino or N-(lower alkyl, hydroxylower alkyl, HPh$_1$-lower alkyl or HPh$_1$)-mono-aza-lower alkyleneimino, wherein 2 heteroatoms are separated by at least 2 carbon atoms, e.g. piperazino, 4-(methyl, ethyl, 2-hydroxyethyl, benzyl or phenyl)-piperazino, 3-aza-1,6-hexyleneimino, 3-(methyl or ethyl)-3-aza-1,6-hexyleneimino, 4-aza-1,7-heptyleneimino or 4-(methyl or ethyl)-4-aza-1,7-heptyleneimino, morpholino, 3,5-dimethyl-morpholino or thiamorpholino. The amino group Am may also be linked with a lower alkylene moiety R, thus forming another ring system of which the moiety -alk-Am-R- is connected with the cyclopropane ring and Am is a ring-member of said ring system. It preferably is 5-membered, i.e. each of alk and R are methylene.

An aliphatic radical R, $R_1$ and $R_2$ is, for example, lower alkyl, e.g. that mentioned above, or lower alkenyl, e.g. vinyl or allyl, which radicals may contain functional groups, such as free, etherified or esterified hydroxy, prim., sec. or tert. amino and/or oxo, e.g. (hydroxy, lower alkoxy, halogeno, Am and/or oxo)-lower alkyl, such as (hydroxy, methoxy, ethoxy, chloro or dimethylamino)methyl, formyl, carboxy or carbo-lower alkoxy, 1- or 2-(hydroxy, methoxy, ethoxy, chloro, dimethylamino, carboxy or carbomethoxy)ethyl or -propyl, lower alkanoyl, e.g. acetyl or pivaloyl.

An araliphatic or aromatic radical R is, for example, HPh$_1$-lower alkyl, -alkanoyl or -hydroxyalkyl or HPh$_1$ respectively, e.g. benzyl, 1- or 2-phenethyl, benzoyl, phenylacetyl or α-hydroxybenzyl; phenyl, tolyl, anisyl, halophenyl, nitrophenyl, aminophenyl or acetylphenyl.

R preferably represents hydrogen, halogeno, lower alkyl, hydroxy-lower alkyl, lower alkoxy-lower alkyl, halogeno-lower alkyl, Am-lower alkyl, carboxy, carbo-lower alkoxy, $R_4$-phenyl-lower alkyl or $R_4$-phenyl, in which $R_4$ has been defined above. Each of $R_1$ and $R_2$ preferably represents hydrogen, lower alkoxy, halogeno, lower alkyl, hydroxy-lower alkyl, halogeno-lower alkyl, above all trifluoromethyl, carboxy or carbo-lower alkoxy.

Acyl derivatives of primary or secondary amines of Formula I are preferably those of aliphatic or araliphatic carboxylic or sulfonic acids, such as of lower alkanoic, lower alkanesulfonic, $R_4$-phenyl-lower alkanoic or $R_4$-benzenesulfonic acids, e.g. of acetic, propionic, pivalic, methanesulfonic, ethanesulfonic, benzoic, phenylacetic or p-toluenesulfonic acid.

Quaternaries and salts of the compounds of Formula I are preferably lower alkyl or $R_4$-phenyl-lower alkyl quaternaries and acid addition salts.

The compounds of the invention exhibit valuable pharmacological properties, for example, imipramine-type antidepressant and amphetamine potentiating effects. This can be demonstrated in animal tests, using advantageously mammals, such as mice, rats or monkeys, as test objects. The compounds of the invention can be applied to the animals enterally, e.g. orally, or parenterally, e.g. subcutaneously or intraperitoneally, preferably in the form of capsules or aqueous solutions or suspensions. The dosage may range between about 0.1 and 75 mg./kg./day, preferably between about 1 and 50 mg./kg./day, advantageously between about 10 and 25 mg./kg./day, whereby the enterally administered dosage form is preferred. The antidepressant activity is being observed, for example, in mice by antagonizing either the ptosis induced by tetrabenazine or the hypothermia caused by reserpine, or in rats by potentiation of amphetamine. The latter test is performed according to P. Carlton, Psychopharmacologia 1961, vol. II, p. 364, with about 8 months old male rats, which are trained to press a bar every 30 seconds, in order to avoid an electric shock applied through the floor grid. In case the animals receive 0.25 mg./kg./day of amphetamine, their performing rate for avoiding said shocks during a test period of about 2½ hours is higher than that of placebo (saline) treated animals. In case the animals receive the compounds of the invention in the above-mentioned doses and about 45 minutes later the amphetamine, their rate of avoidance is highest, as compared with that of animals receiving (a) saline alone, (b) saline and amphetamine or (c) the compounds of the invention and saline. In monkeys, e.g. squirrel or rhesus monkeys, antidepressant activity can be observed without sedation. For example, according to an avoidance schedule, the monkey must press a lever within a certain time interval to avoid the onset of an electric foot shock. Each lever press postpones the shock for 20 seconds and if the monkey fails to press the lever, 0.5 second shocks are delivered at 20 second intervals, unless the animal again presses the lever. Another schedule requires the animal to press the lever 15 times within 20 seconds in the presence of a neutral stimulus, i.e. a steady white light over the lever, to obtain a food reinforcement. The compounds of the invention produce in this test an increase in performance, which is maintained for several, e.g. 4 hours. Accordingly, the compounds of the invention are useful antidepressants in the treatment or management of exo- or endogenous depressions, but also useful intermediates in the preparation of other valuable products, especially of pharmacologically active compounds.

Particularly useful are the compounds of Formula I, in which each of $Ph_1$ and $Ph_2$ is $R_4$-1,2-phenylene, alk is lower alkylene, Am is amino, mono- or di-lower alkylamino, 3 to 7 ring-membered cycloalkylamino or cycloalkyl-lower alkylamino, lower alkyleneimino, monoaza-, oxa- or thia-lower alkyleneimino or N-(lower alkyl or hydroxy-lower alkyl)-monoaza-lower alkyleneimino wherein 2 hetero atoms are separated by at least 2 carbon atoms, R is hydrogen, lower alkyl, hydroxy-lower alkyl or $R_4$-phenyl, each of $R_1$ and $R_2$ is hydrogen or lower alkyl and $R_4$ is hydrogen, lower alkyl, lower alkoxy, halogeno, trifluoromethyl, nitro, amino or di-lower alkylamino, the N-oxide, lower alkyl quaternaries or acid addition salts thereof.

Preferred compounds of the invention are those of Formula II

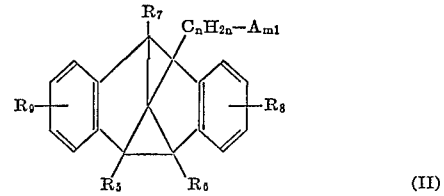

(II)

in which $Am_1$ is amino, mono- or di-lower alkylamino, 3 to 5 ring-membered cycloalkylmethylamino, 5 to 7 ring-membered lower alkyleneimino, piperazino, morpholino, thiamorpholino or N-(lower alkyl, 2- or 3-hydroxy-lower alkyl)-piperazino, $R_5$ is hydrogen, methyl, hydroxymethyy or phenyl, each of $R_6$ and $R_7$ is hydrogen or methyl, each of $R_8$ and $R_9$ is hydrogen, methyl, methoxy, chloro or nitro and $n$ is the integer 1, 2 or 3, the N-oxide or therapeutically acceptable acid addition salts thereof.

Especially valuable are the compounds of Formula II, in which $Am_1$ is amino, methylamino, ethylamino, dimethylamino, diethylamino, cyclopropylmethylamino, pyrrolidino, piperidino, piperazino, 4-methylpiperazino or 4-(2-hydroxyethyl)-piperazino, $R_5$ is hydrogen, hydroxymethyl or phenyl, each of $R_6$ and $R_7$ is hydrogen, each of $R_8$ and $R_9$ is hydrogen, methyl or chloro, and $n$ is the integer 1 to 2, the N-oxide or therapeutically acceptable acid addition salts thereof.

Outstanding are the 1-methylaminomethyl-dibenzosemibullvalene and the 1-dimethylaminomethyl-dibenzosemibullvalene, or therapeutically acceptable acid addition salts thereof, which exhibit at the above-described dosage levels, preferably between about 1 and 25 mg./kg./day orally, a high order of antidepressant activity in the squirrel or rhesus monkey.

The compounds of this invention are prepared according to methods known per se. For example, they are obtained by: (a) converting in a compound of the formula

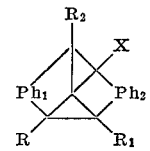

in which X is a substituent capable of being converted into alk-Am, X into said aminoalkyl group and, if desired, converting any resulting compound into another compound of the invention.

The substituent X is, for example, a reatively esterified hydroxyalkyl group, for example, such derived from a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid, or a phosphoniumalkyl group, e.g. a triphenylphosphoniumalkyl halide group. Said groups can be converted into aminoalkyl by condensation with H-Am or an alkali metal, e.g. sodium salt thereof. X may also be a metallic group, preferably an alkali metal atom, e.g. lithium, or halomagnesium, and the corresponding metal organic compound reacted with a reactively esterified aminoalkanol or an unsubstituted or N-substituted ethyleneimine.

Another substituent X is, for example, a (nitro, oximino, imino, cyano, carbamoyl, isocyanato or esterified carboxyamino, e.g. carbalkoxyamino)-alkyl, -alkenyl, -alkanoyl or -hydroxyalkyl group, an aminoalkenyl, -alkanoyl or -hydroxyalkyl group, cyano or preferably carbamoyl, e.g. COAm, which radicals can be converted into aminoalkyl by reduction and/or hydrolysis. Said reduction is carried out under mild and careful conditions, so as to prevent opening of the cyclopropane ring. The above nitro compounds, nitriles, amides, isocyanates, urethanes or alkanoyl compounds are advantageously reduced with the use of simple or complex light metal hydrides, e.g. boron hydride or alkali metal boron or aluminum hydrides, such as lithium aluminum hydride or sodium boron hydride. In this reduction, the cyano and carbamoyl groups are converted into aminomethyl groups, the isocyanato or esterified carboxyamino groups into methylamino groups and the alkanoyl groups into alkyl or $\alpha$-hydroxy alkyl groups. Said oximes, Schiff's bases (i.e. iminoalkyl- or aminohydroxyalkyl compounds) or said $\omega$-amino-$\alpha$-hydroxyalkyl reduction products of the alkanoyl compounds, as well as the nitro compounds and aminoalkenyl compounds, are preferably reduced with nascent hydrogen, such as hydrogen generated electrolytically or by the action of metals on acids or alcohols, e.g. zinc or iron and mineral or alkanoic acids, sodium or aluminum or their amalgams and lower alkanols. Also carefully controlled catalytic reduction may be applied, i.e. hydrogen in the presence of nickel, palladium or platinum catalysts. Isocyanates and urethanes may also be subjected to hydrolysis, e.g. with the use of aqueous mineral acids or alkalis.

The compounds of the invention so obtained can be converted into each other according to methods known per se. For example, resulting primary, secondary or tertiary amines can be reacted with reactive esters of the corresponding alcohols, with lower alkyleneoxides, e.g. ethyleneoxide, or with aldehydes or ketones and reducing agents, e.g. formic acid or its functional derivatives or nascent hydrogen, in order to obtain secondary or tertiary amines, or quaternaries respectively. Resulting primary or secondary amines can also be acylated, for example, with the use of the corresponding acid halides or anhydrides, or acyl derivatives obtained hydrolyzed, e.g. with acids or alkalies, or reduced with simple or complex light metal hydrides. Resulting tertiary amines can be converted into N-oxides or secondary amines, for example by treating them with oxidation or acylating agents, such as hydrogen peroxide or peracids, or acid halides or anhydrides respectively, e.g. aliphatic or aromatic percarboxylic acids, or haloformic acid esters. Furthermore, nitro groups may be introduced into aromatic moieties, e.g. by the action of nitric-sulfuric acid or by pyrolysis of nitrates, advantageously in acidic media, e.g. in trifluoroacetic acid, or nitro groups present therein reduced, e.g. with nascent hydrogen. Resulting hydroxy-compounds, e.g. those of Formula I in which R is hydroxyalkyl, can be esterified and/or etherified, e.g. with the use of acid halides or anhydrides, including thionyl or phosphorus halides or oxyhalides, if desired, followed by the action of lower alkanols or alkali metal alkoxides. Resulting acids can be esterified with the corresponding alcohols in the presence of a strong acid, e.g. hydrochloric, sulfuric, benzene or p-toluene sulfonic acid, or with diazo compounds, and resulting esters hydrolyzed or transesterified in the presence of acidic or alkaline agents, e.g. mineral or complex heavy metal acids or alkali metal carbonates or alcoholates. A resulting acid can also be decarboxylated or converted into its salts according to conventional methods, for example, by pyrolysis in the presence or absence of catalysts, e.g. copper powder, or by treatment with an about stoichiometric amount of a suitable salt-forming reagent, respectively, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products (containing either an asymmetrical carbon atom or no center of symmetry) can likewise be resolved into the optical antipodes, for example by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to the methods illustrated by the examples. Starting material mentioned under item (a) is prepared analogous to the reactions described in J. Am. Chem. Soc. 88, 2882 (1966) and 90, 4465, i.e., by irradiation. The semibullvalenes obtained can then be converted into the other starting materials as described for the final products of the invention. For example, resulting esters can be hydrolyzed or transesterified in the presence of acidic or alkaline agents, e.g. mineral or complex heavy metal acids or alkali metal carbonates or alcoholates, or treated with H-Am. Resulting acids can be converted into their halides by treatment with thionyl or oxalyl halides or phosphorus halides or oxyhalides. Resulting acid halides may be treated with alcohols, ammonia or amines and resulting metal or ammonium salts with aliphatic or araliphatic halides or chlorosulfites, thionyl halides, phosphorus oxide, halides or oxyhalides or other acyl halides as well as alkali metal cyanides, in order to obtain the corresponding esters, halides, anhydrides, amides or the nitrile respectively. Resulting amides can be hydrolyzed under acidic or alkaline conditions, e.g. with the use of aqueous mineral and/or carboxylic acids or alkali metal hydroxides, also alcoholized or transaminated. A resulting ester, salt or nitrile, containing in α-position at least one hydrogen atom or a 1-halo compound, can be metallized in said α- or 1-position, e.g. with the use of alkali metals or reactive derivatives thereof, e.g. organic metal compounds, such as phenyl or butyl lithium, triphenylmethyl sodium or sodium amides or alcoholates, and thereupon reacted with ethylene oxide, a reactive ester of a corresponding alcohol or a corresponding functional acid derivative, e.g. an unsubstituted or correspondingly substituted lower alkyl or alkanoyl halide. Starting material in which X contains more than one carbon atom can be obtained from that in which X is halomethyl according to the Wittig reaction to yield said phosphonium compounds. Readily available compounds in which X is acetyl, can be converted into corresponding amides according to the Willgerodt-Kindler reaction or may be halogenated and aminated in order to yield the compounds in which X is Am-lower alkanoyl. The latter compounds can also be obtained by amino-methylation according to Mannich, i.e. reaction of the 1-lower alkanoyl derivatives with formaldehyde or a derivative thereof, e.g. paraformaldehyde, and H-Am. The 1-aminoalkanoyl compounds so obtained can be reduced, for example with sodium boron hydride or a Grignard compound, to yield 1-(ω-Am-α-hydroxyalkyl)-compounds. These can be dehydrated, e.g. with sulfuric or phosphoric acid, to yield corresponding aminoalkenyl compounds. Compounds in which X is formyl, can be reacted with nitromethane in order to yield corresponding 2-nitroethenyl compounds. Finally, the isocyanates and urethanes can be obtained from said acid halides and sodium azide, and decomposing the resulting azide according to Curtius, i.e. by pyrolysis in the presence or absence of an alcohol, such as a lower alkanol.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders and/or effervescent mixtures and (e) adsorbents, colorants, flavors and/or sweeteners. Injectable compositions are preferably aqueous isotonic solutions or suspensions, and suppositories are advantageously fatty emulsions or suspensions. They may be sterilized and/or contain adjuvant, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

EXAMPLE 1

The solution of 2 g. 1-dimethylcarbamoyl-dibenzosemibullvalene in 100 ml. tetrahydrofuran is added dropwise to the suspension of 0.5 g. lithium aluminum hydride in 25 ml. diethyl ether while stirring, and the mixture is refluxed for 10 hours. After cooling, 1 ml. ethyl acetate is added dropwise, followed by 0.5 ml. water, 1 ml. 12% aqueous sodium hydroxide and 1.5 ml. water. It is filtered, the filtrate evaporated in vacuo and the residue taken up in diethyl ether. The solution is extracted with 5% aqueous hydrochloric acid, the extract made basic with ammonia and the mixture extracted with diethyl ether. The extract is washed with water, dried evaporated and the residue recrystallized from aqueous ethanol, to yield the 1-dimethylaminomethyl-dibenzosemibullvalene of the formula

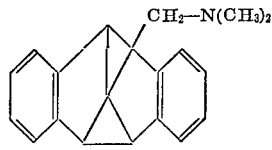

melting at 80°.

1 g. thereof is taken up in the minimum amount of anhydrous ethanol, the solution acidified with ethanolic hydrochloric acid and the precipitate formed recrystallized from ethanol-diethyl ether, to yield the corresponding mono-hydrochloride melting at 252–254°.

The starting material is prepared as follows: The solution of 10 g. 11-carboxy-9,10-ethenoanthracene in 250 ml. tetrahydrofuran is irradiated by a low-pressure ultraviolet lamp until no starting material can be detected by NMR-analysis. It is evaporated and the residue recrystallized from ethanol, to yield the 1-carboxy-dibenzosemibullvalene melting at 230–232°.

The mixture of 5 g. thereof and 30 ml. thionyl chloride is allowed to stand for 2 days at room temperature and evaporated in vacuo, to yield the corresponding acid chloride melting at 176–178°.

To the solution of 10 g. thereof in 50 ml. ethyl acetate, 24 ml. of a 4.6 N dimethylamine solution in ethyl acetate are added while cooling and stirring. The mixture is allowed to stand at room temperature for 2 hours, evaporated in vacuo, and the residue triturated with water, to yield the 1-dimethylcarbamoyl-dibenzosemibullvalene melting at 204–205°.

EXAMPLE 2

To the mixture of 1.4 g. 1-bromomethyl-dibenzosemibullvalene and 1 ml. benzene, 5 ml. 5.1 N ethanolic dimethylamine are added and the mixture heated in a sealed tube to 100° for 24 hours. It is evaporated, the residue taken up in diethyl ether and the solution extracted with 5% hydrochloric acid. The aqueous phase is made basic with ammonia and extracted with diethyl ether. The extract is dried, evaporated, and the residue recrystallized several times from aqueous ethanol, to yield the 1-dimethylaminomethyl-dibenzosemibullvalene, which is identical with the product obtained according to Example 1.

The starting material is prepared as follows: The solution of 10 g. 11-carbethoxy-9,10-ethenoanthracene in 200 ml. cyclohexane is irradiated for 1 week with a low-pressure ultraviolet lamp, during which time it is filtered several times. It is evaporated in vacuo and the residue recrystallized from ethanol, to yield the 1-carbethoxy-dibenzosemibullvalene melting at 131–136°.

The solution of 3 g. thereof in the minimum amount of anhydrous diethyl ether is added dropwise to the suspension of 0.76 g. lithium aluminum hydride in 15 ml. diethyl ether while stirring, and the mixture is refluxed for 6 hours. After standing overnight at room temperature, it is combined with 1 ml. ethyl acetate, 0.7 ml. water, 1.5 ml. 12% sodium hydroxide and 2.3 ml. water, in this order, and filtered. The filtrate is evaporated in vacuo and the residue recrystallized from ethanol, to yield the 1-hydroxymethyl-dibenzosemibullvalene melting at 139–142°.

To the solution of 1.7 g. thereof in 30 ml. anhydrous diethyl ether, 0.24 ml. phosphorus tribromide are added at −70° while stirring, and stirring is continued for 3 hours at this temperature and overnight at room temperature. Hereupon ice is added and, after stirring for 1 hour, the organic layer collected. It is washed quickly with saturated aqueous sodium bicarbonate, dried and evaporated in vacuo, to yield the 1-bromomethyl-dibenzo-semibullvalene, which is used as such without further purification.

EXAMPLE 3

According to the method described in Example 1, the compound of the formula

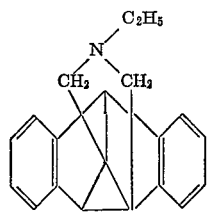

(I.R.—absorption at 3050, 2755, 1355, 1020, 750, 740 and 700 cm.$^{-1}$.)

is prepared from the corresponding cyclic N-ethylimide and equivalent amounts of lithium aluminum hydride. Said N-ethylimide is obtained either from the 1,2-dicarboxy-dibenzosemibullvalene and aqueous ethylamine, evaporating the solution of the bis-ethyl-ammonium salt and heating the latter in N-ethyl-pyrrolidone to about 150–200°, or from the dibenzosemibullvalene-1,2-dicarboxylic acid lactone and ethanolic ethylamine at elevated temperature and pressure.

According to the method described in Example 2, the 1-pyrrolidinomethyl-dibenzosemibullvalene can be prepared.

By analogous irradiation of a cyclohexane solution of 11-(2 - dimethylaminoethyl)-9,10-ethenoanthracene containing some acetone as photosensitizer, the 1-(2-dimethylaminoethyl)-dibenzosemibullvalene is obtained; it may be converted into its hydrochloride as shown in the previous examples.

The starting material can be prepared as follows: The mixture of 200 g. anthracene, 96 g. 3-butynol, 2.5 g. hydroquinone and 600 ml. toluene is heated in an autoclave to about 210° for 15 hours. It is filtered, the residue washed with acetonitrile and the filtrate evaporated in vacuo. The residue is taken up in the minimum amount of methanol at room temperature and the mixture chilled in the refrigerator. It is filtered, the filtrate evaporated in vacuo, the residue taken up in the minimum amount of chloroform-ethyl acetate (9:1), the solution chromatographed on silica and the eluate obtained with ethyl acetate evaporated, to yield the 11-(2-hydroxyethyl)-9,10-etheno-anthracene having an R$_f$ of 5.5.

To the solution of 2.8 g. thereof in 100 ml. diethyl ether, 0.7 ml. phosphorus tribromide are added during 10 minutes at —70° while stirring, and stirring is continued at room temperature for 5 hours. The mixture is carefully combined with water, the precipitate formed filtered off and recrystallized from acetone, to yield the 11-(2-bromoethyl) - 9,10 - etheno-anthracene melting at 180°.

The mixture of 5 g. thereof 50 ml. benzene and 60 ml. 5 N ethanolic dimethylamine is allowed to stand at room temperature for 1 week. It is evaporated in vacuo, the residue taken up in diethyl ether, the solution extracted with 5% hydrochloric acid and the aqueous layer made basic with ammonia. It is extracted with diethyl ether, the extract dried, filtered and evaporated. The residue is taken up in the minimum amount of isopropanol and the solution slightly acidified with isopropanolic hydrogen bromide, to yield the 11-(2-dimethylaminoethyl)-9,10-etheno-anthracene hydrobromide melting at 245–246°. It is taken up in water, the solution made basic with ammonia, extracted with diethyl ether, the extract dried and evaporated to yield the corresponding free base.

EXAMPLE 4

Preparation of 10,000 tablets each containing 10.0 mg. of the active ingredient:

| Formula: | G. |
|---|---|
| 1 - dimethylaminomethyldibenzosemibullvalene | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water, q.s. | |

Procedure.—All the powders are passed through a screen with openings of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml. water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

EXAMPLE 5

To the boiling mixture of 17 g. lithium aluminum hydride and 100 ml. diethyl ether, the solution of 68.5 g. 1-methylcarbamoyl-dibenzosemibullvalene in 1 liter tetrahydrofuran is added dropwise while stirring and refluxing is continued for 6½ hours. After cooling 17 ml. water are added dropwise, followed by 34 ml. 12% aqueous sodium hydroxide in 51 ml. water. The mixture is filtered, the filtrate evaporated in vacuo, the residue taken up in the minimum amount of ethanol and the solution acidified with ethanolic hydrochloric acid. The precipitate formed is filtered off and recrystallized from ethanol, to yield the 1-methylaminomethyl - dibenzosemibullvalene hydrochloride of the formula

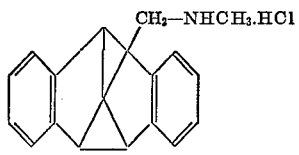

melting at 264–265° with decomposition.

The starting material is prepared as follows: The mixture of 75 g. 1-carboxy-dibenzosemibullvalene and 500 ml. thionyl chloride is allowed to stand overnight at room temperature and evaporated in vacuo. The residue is taken up in 100 ml. benzene and the mixture again evaporated in vacuo. The residual dibenzosemibullvalene-1-carboxylic acid chloride is taken up in 2 liters ethyl acetate and 365 ml. 4 N methylamine in ethyl acetate are added dropwise while cooling and stirring. The mixture is allowed to stand at room temperature for 3 hours, washed with water, 5% hydrochloric acid and again water and evaporated in vacuo. The residue is recrystallized from ethanol, to yield the 1-methylcarbamoyl - dibenzosemibullvalene melting at 182–184°.

EXAMPLE 6

To the stirred suspension of 0.25 g. lithium aluminum hydride in 15 ml. diethyl ether, the saturated solution of 1 g. 1-pyrrolidinocarbonyl-dibenzosemibullvalene in tetrahydrofuran is added dropwise and the mixture refluxed for 8 hours. After cooling 0.25 ml. water, 0.5 ml. 12% aqueous sodium hydroxide and 0.75 ml. water are added while stirring, the mixture filtered and the filtrate evaporated in vacuo. The residue is taken up in diethyl ether, the mixture extracted with 5% hydrochloric acid, the extract made basic with ammonia and extracted with diethyl ether. The extract is evaporated and the residue recrystallized from ethanol, to yield the 1-pyrrolidinomethyl-dibenzosemibullvalene of the formula

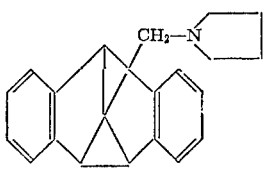

melting at 111–115°. The corresponding hydrobromide melts at 224–227° after recrystallization from isopropanol.

The starting material is prepared as follows: To the solution of 1.25 g. dibenzosemibullvalene - 1 - carboxylic acid chloride in 25 ml. ethyl acetate, that of 1.7 g. pyrrolidine in 25 ml. ethyl acetate is added dropwise and the mixture stirred at room temperature for 2½ hours. It is washed with water, 5% hydrochloric acid and water, evaporated and the residue recrystallized from ethanol, to yield the 1-pyrrolidinocarbonyl-dibenzosemibullvalene melting at 166–169°.

EXAMPLE 7

To the suspension of 0.38 g. lithium aluminum hydride in 15 ml. diethyl ether, the solution of 1.2 g. 1-(4-methylpiperazinocarbonyl) - dibenzosemibullvalene in 75 ml. tetrahydrofuran and 50 ml. diethyl ether is added while stirring and the mixture refluxed for 8 hours. After cooling 0.38 ml. water, 0.76 ml. 12% aqueous sodium hydroxide and 1.14 ml. water are added, the mixture filtered and the filtrate evaporated in vacuo. The residue is taken up in diethyl ether, the solution extracted with 5% hydrochloric acid, the extract made basic with ammonia and extracted with diethyl ether. The extract is evaporated in vacuo, the residue taken up in ethanol, the solution neutralized with ethanolic hydrochloric acid, the precipitate formed filtered off and recrystallized from ethanol, to yield the 1-(4-methylpiperazinomethyl)-dibenzosemibullvalene hydrochloride of the formula

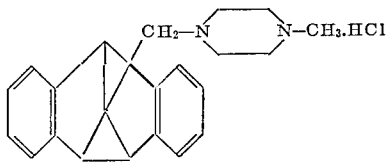

melting at 280–285°.

The starting material is prepared as follows: To the solution of 1.25 g. dibenzosemibullvalene-1-carboxylic acid chloride in 25 ml. ethyl acetate, that of 2.4 g. 1-methylpiperazine in 25 ml. ethyl acetate is added dropwise and the mixture stirred at room temperature for 2½ hours. The precipitate formed is filtered off and the organic solution extracted with water and 5% hydrochloric acid. The precipitate formed from the aqueous solutions on standing is combined with the previous precipitate and the whole recrystallized from ethano, to yield the 1-(4-methylpiperazinocarbonyl) - dibenzosemibullvalene melting at 203–206°.

EXAMPLE 8

The solution of 1.24 g. 1-[4 - (2 - hydroxyethyl)-piperazinocarbonyl]-dibenzosemibullvalene in 50 ml. tetrahydrofuran is added dropwise to the stirred suspension of 0.3 g. lithium aluminum hydride in 10 ml. diethyl ether and the mixture refluxed for 8 hours. After cooling 0.3 ml. water, 0.6 ml. 12% aqueous sodium hydroxide and 0.9 ml. water are added, the mixture filtered and the filtrate evaporated in vacuo. The residue is taken up in diethyl ether, the solution acidified with 6 N isopropanolic hydrobromic acid, the precipitate formed filtered off and recrystallized from isopropanol-ethanol, to yield the 1-[4-(2 - hydroxyethyl) - piperazinomethyl] - dibenzosemibullvalene dihydrobromide of the formula

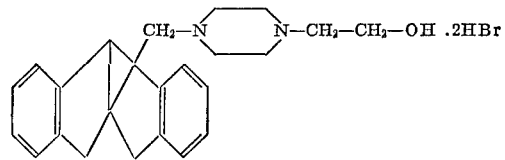

melting at 260–261° (hygroscopic).

The starting material is prepared as follows: To the solution of 1.25 g. dibenzosemibullvalene - 1 - carboxylic acid chloride in 25 ml. ethyl acetate, that of 0.75 g. 1-(2-hydroxyethyl)-piperazine in 25 ml. ethyl acetate is added dropwise and the mixture stirred for 2½ hours at room temperature. The precipitate formed is filtered off and washed with ethyl acetate, to yield the 1-[4-(2-hydroxyethyl)-piperazinocarbonyl] - dibenzosemibullvalene melting at 156–158°.

EXAMPLE 9

The solution of 1.4 g. 1-dimethylcarbamoylmethyl-dibenzosemibullvalene in 50 ml. diethyl ether and 20 ml. tetrahydrofuran is added dropwise to the mixture of 0.3 g. lithium aluminum hydride in 15 ml. diethyl ether while stirring and the mixture is refluxed for 6 hours. After cooling 0.3 ml. water, 0.6 ml. 18% aqueous sodium hydroxide and 0.9 ml. water are added, the mixture filtered and the filtrate extracted with 5% hydrochloric acid. The extract is made basic with ammonia, extracted with diethyl ether, the extract dried, filtered and evaporated in vacuo. The residue is taken up in isopropanol, the solution acidified with isopropanolic hydrobromic acid, diluted with diethyl ether and the precipitate formed filtered off, to yield the 1-(2-dimethylaminoethyl)-dibenzosemibullvalene hydrobromide of the formula

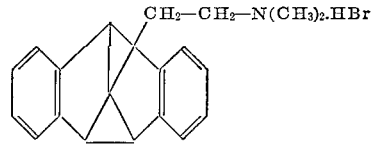

melting at 248–250°.

The starting material is prepared as follows: The saturated ethereal solution of dibenzosemibullvalene-1-carboxylic acid chloride (prepared from 2.5 g. of the acid and 25 ml. thionyl chloride) is added to the ethereal diazomethane solution (prepared from 6.65 g. 75% N-nitrosomethylurea) and the mixture is allowed to stand at room temperature overnight. It is evaporated in vacuo and the residue recrystallized from ethanol, to yield the 1-diazomethylcarbonyl-dibenzosemibullvalene melting at 173–175° with decomposition.

To the mixture of 1.3 g. thereof, 50 ml. benzene and 0.9 ml. dimethylamine, the saturated and filtered solution of 2.3 g. silver benzoate in triethylamine is added dropwise while cooling and the mixture is stirred, overnight at room temperature. It is combined with 1 g. charcoal, filtered and the filtrate evaporated in vacuo. The residue is taken up in diethyl ether, the solution washed with aqueous sodium bicarbonate, dried and evaporated in vacuo, to yield the 1-dimethylcarbamoylmethyl-dibenzosemibullvalene, showing in the IR spectrum a strong band at 1640 cm.$^{-1}$.

EXAMPLE 10

To the suspension of 0.5 g. lithium aluminum hydride in 50 ml. diethyl ether, the solution of 2 g. 1-dimethylcarbamoyl-10-chloro-dibenzosemibullvalene in 50 ml. diethyl ether and 50 ml. tetrahydrofuran is added dropwise while stirring and the mixture refluxed for 6 hours. After cooling 0.5 ml. water, 1 ml. 12% aqueous sodium hydroxide and 1.5 ml. water are added, the mixture filtered and the filtrate extracted with 5% hydrochloric acid. The aqueous phase is made basic with ammonia, the mixture extracted with diethyl ether, the extract evaporated and the residue taken up in ethanol. The solution is acidified with ethanolic hydrobromic acid and the precipitate formed filtered off, to yield the 1-dimethylaminomethyl-10-chlorodibenzosemibullvalene hydrobromide of the formula

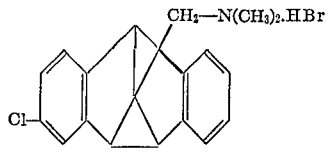

melting at 208–211° with decomposition.

The starting material is prepared as follows: The mixture ofr 22.5 g. 2-chloroanthracene, 10.4 g. ethyl propiolate and the 120 ml. xylene is refluxed for 1 week. After cooling, it is filtered and the filtrate evaporated in vacuo. The residue is taken up in 40 ml. methanol and 100 ml. 18% aqueous sodium hydroxide, and the mixture refluxed for 4 hours. It is cooled, filtered, the filtrate acidified with hydrochloric acid and extracted with diethyl ether. The extract is dried, filtered, evaporated and the residue recrystallized from aqueous ethanol, to yield the 2-chloro-9,10-ethanoanthracene-11-carboxylic acid melting at 214–218°.

The solution of 5 g. thereof in 400 ml. tetrahydrofuran is irradiated for 23 hours with ultra-violet light of the 2537 A. region and the mixture evaporated in vacuo. 2.4 g. of the residue is taken up in 24 ml. thionyl chloride and the mixture allowed to stand at room temperature overnight. It is evaporated in vacuo, the residue taken up in benzene and the mixture again evaporated in vacuo, to yield the 10-chloro-dibenzosemibullvalene - 1 - carboxylic acid chloride.

To the solution of 2.5 g. thereof in 10 ml. ethyl acetate, 9 ml. of a 0.04 molar solution of dimethylamine in ethyl acetate is added dropwise and the mixture stirred for 2½ hours at room temperature. It is washed with water, 5% hydrochloric acid and water, dried, filtered and evaporated, to yield the 1-dimethylcarbamoyl-10-chloro-dibenzosemibullvalene, which is used as such without further purification.

EXAMPLE 11

The solution of 3.7 g. 1-carbamoylmethyl-dibenzosemibullvalene in 100 ml. tetrahydrofuran is added dropwise to the stirred suspension of 1 g. lithium aluminum hydride in 10 ml. tetrahydrofuran and 10 ml. diethyl ether. The mixture is refluxed for 16 hours, cooled and combined with 1 ml. water, 2 ml. 12% aqueous sodium hydroxide and 3 ml. water. It is filtered, the filtrate evaporated in vacuo, the residue taken up in the minimum amount of hot ethanol, the solution cooled and acidified with ethnolic hydrogen chloride. The precipitate formed is filtered off and recrystallized from ethanol-diethyl ether, to yield the 1-aminomethyl - dibenzosemibullvalene hydrochloride of the formula

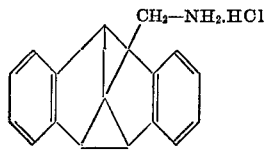

melting above 290°.

The starting material is prepared analogous to the method described in Example 5; it melts at 204–205°.

EXAMPLE 12

To the suspension of 0.6 g. lithium aluminum hydride in 25 ml. diethyl ether, the solution of 2.3 g. 1-dimethylcarbamoyl-10-methyl-dibenzosemibullvalene in 50 ml. diethyl ether is added dropwise while stirring, and the mixture is refluxed for 8 hours. After cooling 0.6 ml. water, 1.2 ml. 12% aqueous sodium hydroxide and 1.8 ml. water are added, the mixture filtered and the filtrate evaporated in vacuo. The residue is triturated with petroleum ether, to yield the 1-dimethylaminomethyl-10-methyl-dibenzosemibullvalene of the formula

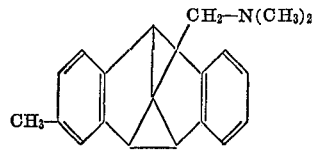

melting at 95–97°.

The starting material is prepared as follows: The mixture of 5 g. 2-methylanthrazene, 2.6 ml. ethyl propiolate and 15 ml. xylene is refluxed for one week, cooled, filtered, and the filtrate evaporated in vacuo. The residue is taken up in 20 ml. methanol and 20 ml. 18% aqueous sodium hydroxide, the mixture refluxed for 4 hours, cooled and filtered. The filtrate is acidified with concentrated hydrochloric acid, the precipitate formed filtered off and recrystallized from aqueous ethanol, to yield the 2-methyl-9,10-ethenoanthracene-11-carboxylic acid, melting at 210–216°.

The solution of 1 g. thereof in 200 ml. tetrahydrofuran is irradiated for 23 hours with ultraviolet light of the 2537 A. region and evaporated in vacuo. The residue is taken up in 10 ml. thionyl chloride and the mixture allowed to stand overnight at room temperature. It is evaporated in vacuo, the residue taken up in 5 ml. 5 N dimethylamine in ethyl acetate and the mixture stirred for 3 hours at room temperature. It is washed with water, 5% hydrochloric acid and water, dried, filtered and evaporated, to yield the 1-dimethylcarbamoyl-10-methyl-dibenzosemibullvalene.

EXAMPLE 13

The solution of 0.5 g. dibenzosemibullvalene - 1,2 - dicarboxylic acid-N-methylimide in 10 ml. tetrahydrofuran is added to the stirred and refluxing mixture of 0.2 g. lithium aluminum hydride and 10 ml. diethyl ether, and the whole is refluxed for 24 hours. After cooling, it is combined with 0.2 ml. water, 0.4 ml. 12% aqueous sodium hydride and 0.6 ml. water, filtered and the filtrate evaporated in vacuo, to yield the 1,2-(2-methyl-2-aza-1,3-propano)-dibenzosemibullvalene of the formula

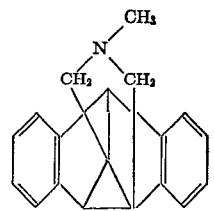

melting at 105°.

It is taken up in the minimum amount of n-propanol and the solution acidified with propanolic hydrogen bromide, to yield the corresponding hydrobromide melting at 255°.

The starting material is prepared as follows: The solution of 20 g. 11,12-dicarboxy - 9,10 - ethenoanthracene in 2 liters acetone is irradiated for 3 days with a 150W medium pressure ultraviolet lamp, during which time the evaporated acetone is condensed on a cold water noose. The mixture is evaporated in vacuo, the residue triturated with about 20 ml. acetonitrile, filtered off and recrystallized from aqueous ethanol, to yield the 1,2-dicarboxy-dibenzosemibullvalene, melting at 250° with decomposition.

To the stirred solution of 5 g. thereof in 100 ml. acetonitrile, 8 g. 1-cyclohexyl-3-(2-morpholinoethyl)-carbodimide metho-p-toluenesulfonate are added and stirring is continued for 24 hours. The mixture is filtered, the filtrate evaporated in vacuo and the residue taken up in chloroform. The solution is washed with water, aqueous sodium hydroxide and water, dried and evaporated. The residue is triturated with ethyl acetate, filtered off and recrystallized from ethyl acetate, to yield the dibenzosemibullvalene-1,2-dicarboxylic acid anhydride melting at 185°.

To the solution of 2 g. thereof in 50 ml. acetonitrile, 25 ml. of a 4.5 molar solution of methylamine in ethyl acetate are added while stirring at room temperature. After 24 hours, the precipitate formed is filtered off, taken up in water, the solution acidified with hydrochloric acid and the precipitate formed filtered off, to yield the dibenzosemibullvalene-1,2-dicarboxylic acid mono-N-methylamide.

The mixture of 1 g. thereof, 20 ml. pyridine and 2 g. 1-cyclohexyl - 3 - (2 - morpholinoethyl) - carbodiimide metho-p-toluenesulfonate is stirred for 3 days at room temperature and evaporated in vacuo. The residue is taken up in chloroform, the mixture washed with 5% aqueous hydrochloric acid, sodium hydroxide and water, dried and evaporated in vacuo, to yield the dibenzosemibullvalene-1,2-dicarboxylic acid-N-methylimide, melting at 170°.

EXAMPLE 14

The solution of 1.69 g. 2-carboxy-dibenzosemibullvalene-1-carboxylic acid dimethylamide in 150 ml. tetrahydrofuran is added dropwise to the suspension of 0.96 g. lithium aluminum hydride in 25 ml. tetrahydrofuran while stirring and the mixture is refluxed for 8 hours. After cooling, 0.9 ml. water, 1.8 ml. 18% aqueous sodium hydroxide and 2.7 ml. water are added, the mixture filtered and the filtrate evaporated. The residue is taken up in diethyl ether, the solution extracted with 5% hydrochloric acid, the aqueous solution made basic with ammonia and extracted with diethyl ether. The extract is dried, filtered, evaporated and the residue recrystallized from ethanol, to yield the 1-dimethylaminomethyl-2-hydroxymethyl-dibenzosemibullvalene of the formula

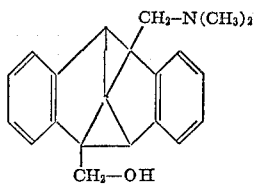

melting at 145–147°. One gram thereof is taken up in the minimum amount of acetone and the solution neutralized with cyclohexylsulfamic acid, to yield the corresponding cyclohexylsulfamate melting at 160–161°.

The starting material is prepared as follows: The mixture of 5 g. dibenzosemibulvalene-1,2-dicarboxylic acid anhydride, 25 ml. acetonitrile and 15 ml. 5 N dimethylamine in ethyl acetate is stirred overnight at room temperature and evaporated in vacuo. The residue is taken up in 100 ml. N aqueous sodium hydroxide, the mixture filtered, the filtrate acidified with hydrochloric acid, the precipitate formed filtered off and washed with water, to yield the about 10:1 mixture of the 2 isomeric dibenzosemibullvalene-1,2-dicarboxylic acid mono-dimethylamides, melting at 260°. 2 g. thereof are dissolved in the minimum amount of hot ethanol and the solution allowed to cool to room temperature slowly. The precipitate formed is filtered off, to yield the 2-carboxy-dibenzosemibullvalene-1-carboxylic acid dimethylamide melting at 254° with decomposition.

EXAMPLE 15

To the solution of 2.1 g. 1-dimethylaminomethyl-dibenzosemibullvalene in 20 ml. methylene chloride, 2.76 g. 90% 3-chloroperbenzoic acid are added dropwise while stirring and keeping the temperature below 25°. The mixture is stirred at room temperature overnight and finally 0.3 g. 3-chloro-perbenzoic acid are added. After 3 hours, the mixture is washed with saturated aqueous sodium bicarbonate and water, dried, filtered and evaporated. The residue is taken up in the minimum amount of isopropanol, the solution acidified with isopropanolic hydrogen bromide and the precipitate formed filtered off, to yield the 1 - dimethylaminomethyl - dibenzosemibullvalene-N-oxide hydrobromide of the formula

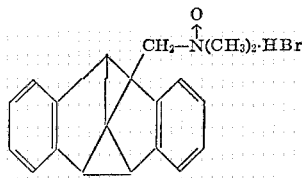

melting at 182–185°.

EXAMPLE 16

The solution of 8 g. 1-piperadinocarbonyl-dibenzosemibullvalene (M.P. 165–168°) in 200 ml. tetrahydrofuran is added dropwise to the stirred suspension of 2.7 g. lithium aluminum hydride and 100 ml. tetrahydrofuran and the mixture is refluxed for 8 hours. After cooling 2.7 ml. water, 5.4 ml. 12% aqueous sodium hydroxide and 8 ml. water are added, the prepicitate formed filtered off and the filtrate evaporated in vacuo. The residue is taken up in diethyl ether, the solution extracted with 5% hydrochloric acid, the equeous layer made basic with ammonia and extracted with diethyl ether. The extract is dried, evaporated, the residue taken up in ethanol, the solution acidified with ethanolic hydrogen chloride and the precipitate formed filtered off, to yield the 1-piperidinomethyl-dibenzosemibullvalene hydrochloride of the formula

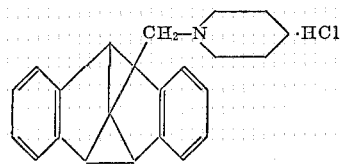

melting at 266–268°.

EXAMPLE 17

The solution of 3.4 g. 1-cyclopropylmethylcarbamoyl-dibenzosemibullvalene (M.P. 176–180°) in 100 ml. tetrahydrofuran is added dropwise to the stirred suspension of 0.9 g. lithium aluminum hydride in 50 ml. diethyl ether and the mixture refluxed for 8 hours. It is worked up as described in the previous examples, to yield the 1 - cyclopropylmethylaminomethyl - dibenzosemibullvalene hydrochloride of the formula

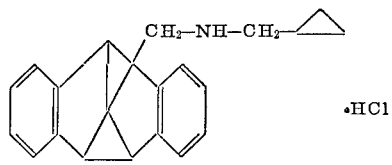

melting at 247–250°.

EXAMPLE 18

The solution of 3.9 g. 1-piperazinocarbonyl-dibenzosemibullvalene is added dropwise to 1.3 g. lithium aluminum hydride in 30 ml. tetrahydrofuran while stirring and the mixture is refluxed for 8 hours. After cooling 1.3 ml. water, 2.6 ml. 12% aqueous sodium hydroxide and 3.9 ml. water are added, the precipitate formed filtered off and the filtrate extracted with 5% hydrochloric acid. The aqueous solution is made basic with ammonia, extracted with diethyl ether, the extract evaporated, the residue taken up in isopropanol and the solution acidified with isopropanolic hydrogen bromide. The precipitate formed is taken up in water, the solution made basic with ammonia, extracted with diethyl ether, the extract washed with water, dried, filtered and evaporated. The residue is again taken up in isopropanol and acidified with isopropanolic hydrogen bromide, to yield the 1-piperazinomethyldibenzosemibullvalene hydrobromide of the formula

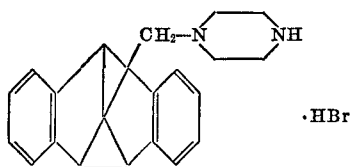

melting at 239–242°.

EXAMPLE 19

The solution of 1 g. 1-(1-hydroxyiminoethyl)-dibenzosemibullvalene in 10 ml. tetrahydrofuran is added dropwise to the suspension of 0.25 g. lithium aluminum hydride an 10 ml. diethyl ether while stirring, and the mixture is refluxed for 6 hours. Atfer cooling 0.25 ml. water, 0.5 ml. 12% aqueous sodium hydroxide and 0.75 ml. water are added, the precipitate filtered off, the filtrate evaporated and the residue taken up in diethyl ether. The solution is extracted with 5% hydrochloric acid, the aqueous solution made basic with ammonia and extracted with diethyl ether. The extract is washed with water, dried, evaporated, the residue taken up in isopropanol and the solution acidified with isopropanolic hydrogen chloride, to yield the 1-(1-aminoethyl)-dibenzosemibullvalene hydrochloride of the formula

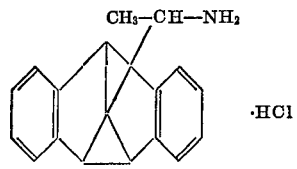

melting at 280–282°.

The starting material is prepared as follows: The solution of 23.4 g. methyl iodide in 40 ml. diethyl ether is added dropwise to the suspension of 2.3 g. lithium wire in 100 ml. diethyl ether while stirring under nitrogen. After the consumption of the lithium, the solution of 10 g. 1-carboxy-dibenzosemibullvalene in 100 ml. diethyl ether is added dropwise while stirring and the mixture refluxed for 3 hours. After cooling, it is filtered, the filtrate diluted with diethyl ether, washed with ice water, 10% aqueous sodium bicarbonate, dried, evaporated and the residue recrystallized from ethanol, to yield the 1-acetyl-dibenzosemibullvalene, melting at 204–205°.

The mixture of 1.7 g. thereof, 1.7 g. hydroxylamine hydrochloride and 42 ml. pyridine is refluxed for 4 hours and evaporated in vacuo. The residue is taken up in water, the mixture extracted with diethyl ether, the extract washed with water, dried, evaporated and the residue recrystallized from ethanol, to yield the 1-(1-hydroxyiminoethyl)-dibenzosemibullvalene, melting at 171–173°.

EXAMPLE 20

The mixture of 2.8 g. 1-(1-aminoethyl)-dibenzosemibullvalene 7.2 g. 36.8% aqueous formaldehyde, 3.3 ml. formic acid and 15 ml. propanol is refluxed for 6 hours and evaporated in vacuo. The residue is taken up in water, the mixture made basic with ammonia and extracted with diethyl ether. The extract is washed with water, evaporated, the residue taken up in ethanol, the solution acidified with ethanolic hydrogen chloride and the precipitate recrystallized from ethanol-diethyl ether, to yield the 1-(1-dimethylaminoethyl)-dibenzosemibullvalene hydrochloride of the formula

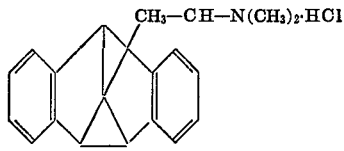

melting at 248-250° with decomposition.

EXAMPLE 21

The solution of 2.2 g. 1-dimethylcarbamoyl-2-phenyl-dibenzosemibullvalene in 35 ml. tetrahydrofuran is added to the mixture of 12 ml. N-diborane in tetrahydrofuran and 20 ml. tetrahydrofuran while stirring. The mixture is refluxed for 6 hours, cooled and 20.6 ml. 2 N hydrochloric acid are added dropwise. The mixture is concentrated, the aqueous concentrate washed with diethyl ether, made basic with ammonia and extracted with diethyl ether. The extract is washed with water, dried and evaporated, to yield the 1-dimethylaminomethyl-2-phenyl-dibenzosemibullvalene of the formula

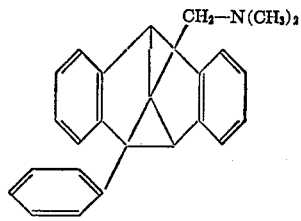

showing in the NMR spectrum singlets at 278, 215 and 136 C.P.S. (60 megacycles in deuterochloroform).

The starting material is prepared as follows: The solution of 10 g. 11-carboxy-12-phenyl-9,10-ethenoanthracene in 1.8 liter acetone is irradiated with a medium pressure U.V. lamp for 96 hours while siphoned through a glass filter. The filtrate is evaporated in vacuo, the residue triturated with dimethylsulfoxide filtered off and recrystallized from ethyl acetate, to yield the 1-carboxy-2-phenyl-dibenzosemibullvalene melting at 130°.

The mixture of 2.2 g. thereof and 20 ml. thionyl chloride is allowed to stand at room temperature overnight and evaporated in vacuo. The residue is taken up in 20 ml. ethyl acetate and 7 ml. 5 N dimethylamine in ethyl acetate are added dropwise while stirring at room temperature. After 3 hours, the mixture is washed with water, dried, evaporated and the residue recrystallized from methanol, to yield the 1-dimethylcarbamoyl-2-phenyl-dibenzosemibullvalene melting at 145–150°.

EXAMPLE 22

Preparation of 10,000 capsules each containing 50.0 mg. of the active ingredient:

| Formula: | G. |
|---|---|
| 1-methylaminomethyl-dibenzosemibullvalene hydrochloride | 500.0 |
| Lactose | 2,350.0 |
| Talcum powder | 150.0 |

Procedure.—All the powders are passed through a screen with openings of 0.6 mm. Then the drug substance is placed in a suitable mixer and mixed first with the talcum, then with the lactose until homogenous. No. 2 capsules are filled with 300 mg. of the mixture, using a capsule filling machine.

What is claimed is:
1. A pharmaceutical composition comprising essentially an antidepressively effective amount of a compound having the formula

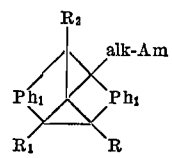

in which each of $Ph_1$ and $Ph_2$ is unsubstituted 1,2-phenylene or 1,2-phenylene substituted by one member selected from the group consisting of lower alkyl, hydroxy, mercapto, lower alkoxy, lower alkylmercapto, halogeno, trifluoromethyl, nitro, amino, di-lower alkylamino, lower alkanoyl and lower alkylsulfonyl, alk is lower alkylene, Am is amino, mono- or di-lower alkylamino, 3 to 7 ring-nembered cycloalkylamino, N-lower alkyl-N-cycloalkylamino, cycloalkyl-lower alkylamino or N-lower alkyl-N-cycloalkyl-lower alkylamino, R is hydrogen, lower alkyl, hydroxy-lower alkyl, unsubstituted phenyl, or phenyl substituted as described for $Ph_1$, each of $R_1$ and $R_2$ is hydrogen or lower alkyl, the N-oxide or a therapeutically acceptable acid addition salt thereof, together with a pharmaceutical excipient.

2. A composition as claimed in claim 1, wherein the effective compound is that of the formula

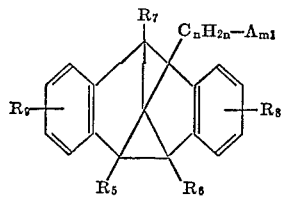

in which $Am_1$ is amino, mono- or di-lower alkylamino or 3 to 5 ring-membered cycloalkylmethylamino, $R_5$ is hydrogen, methyl, hydroxymethyl or phenyl, each of $R_6$ and $R_7$ is hydrogen or methyl, each of $R_8$ and $R_9$ is hydrogen, methyl, methoxy, chloro or nitro and $n$ is the integer 1, 2 or 3, the N-oxide or a therapeutically acceptable acid addition salt thereof.

3. A composition as claimed in claim 2, wherein the effective compound is the 1-methylaminomethyl-dibenzosemibullvalene or a therapeutically acceptable acid addition salt thereof.

4. A composition as claimed in claim 3, comprising an antidepressively effective amount of 1-methylaminomethyl-dibenzosemibullvalene or a therapeutically acceptable acid addition salt thereof and an orally applicable pharmaceutical excipient.

References Cited
UNITED STATES PATENTS

| | | | |
|---|---|---|---|
| 3,423,425 | 1/1969 | Wilhelm | 260—326.14 |
| 3,489,791 | 1/1970 | Ciganek | 260—558 |

STANLEY I. FRIEDMAN, Primary Examiner

U.S. Cl. X.R.

260—239 (E) (B) (BA), 243 (B), 247.1, 247.2 (B), 247.5 (B), 247.7 (F), 268 (FC), 290 (B), 293, 293.4 (A), 294.3, 294.7, 295.5 S

PO-1050 (5/69)    CASE SU-539/1-3

UNITED STATES PATENT OFFICE
CERTIFICATE OF CORRECTION

Patent No. 3,798,329          Dated March 19, 1974

Inventor(s) CHARLES FERDINAND HUEBNER

It is certified that error appears in the above-identified patent and that said Letters Patent are hereby corrected as shown below:

Column 18, claim 1, amend the formula to read as follows:

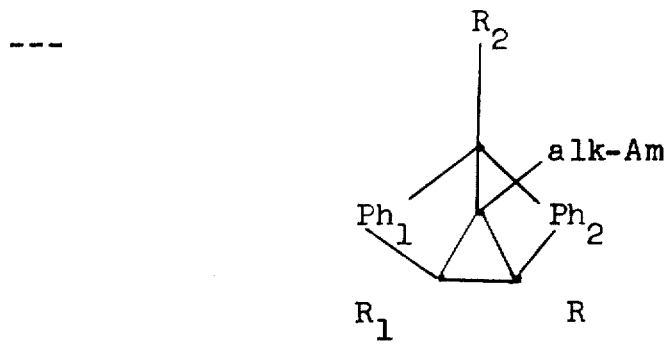

Column 19, claim 2, amend the formula to read as follows:

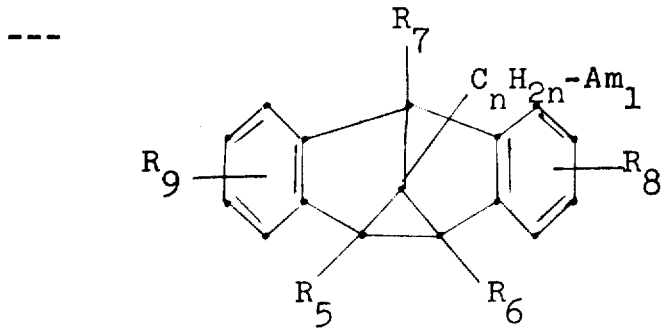

Signed and sealed this 29th day of October 1974.

(SEAL)
Attest:

McCOY M. GIBSON JR.          C. MARSHALL DANN
Attesting Officer            Commissioner of Patents